Oct. 12, 1965 B. D. PARKER 3,212,009
DIGITAL REGISTER EMPLOYING INHIBITING MEANS ALLOWING GATING ONLY UNDER PRESET CONDITIONS AND IN CERTAIN ORDER
Filed Sept. 9, 1963
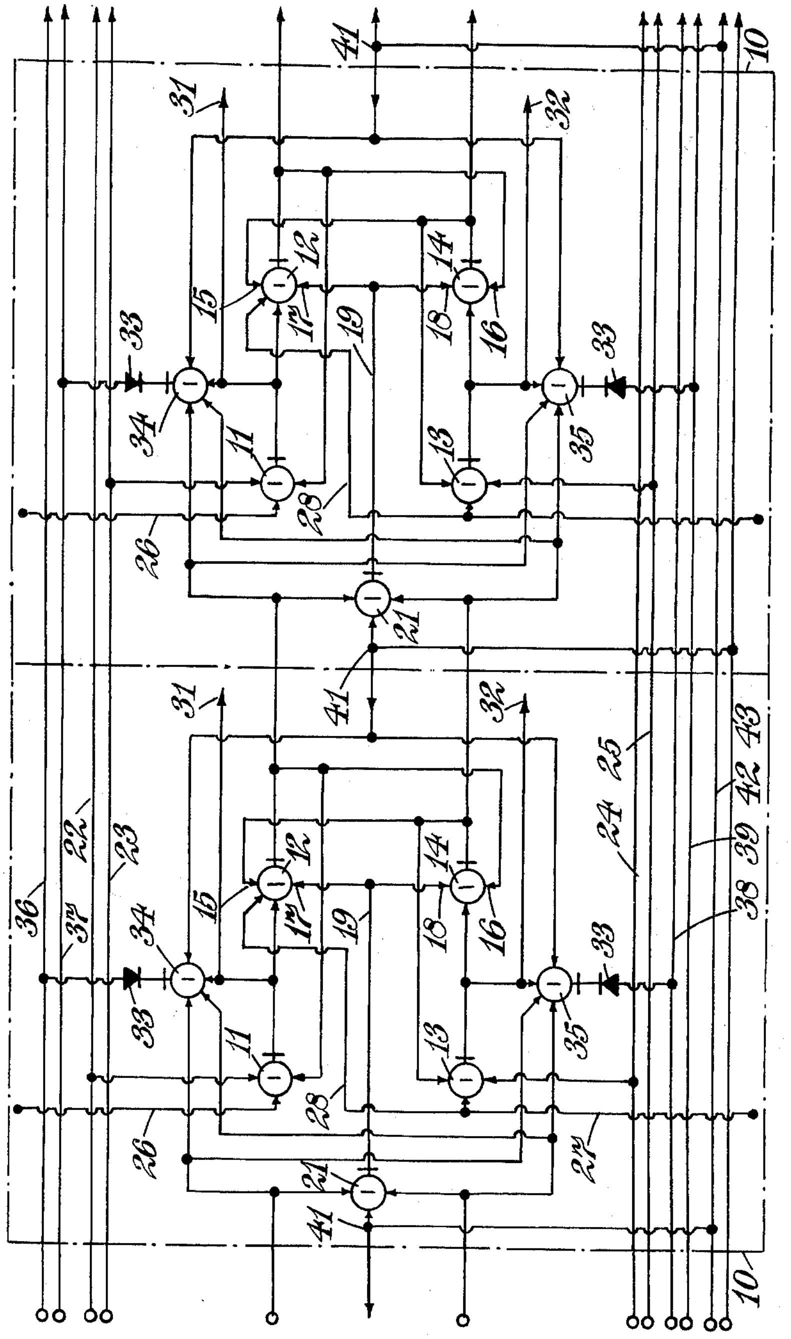

United States Patent Office 3,212,009
Patented Oct. 12, 1965

3,212,009
DIGITAL REGISTER EMPLOYING INHIBITING MEANS ALLOWING GATING ONLY UNDER PRESET CONDITIONS AND IN CERTAIN ORDER

Bernhard Dollman Parker, London, England, assignor to Decca Limited, London, England, a British company Filed Sept. 9, 1963, Ser. No. 307,545
Claims priority, application Great Britain, Sept. 13, 1962, 35,025/62
9 Claims. (Cl. 328—37)

This invention relates to digital registers and in particular to registers for binary digits.

According to this invention a binary digital register comprises a number of stages for storing information in digital form wherein each stage has two bi-stable devices connected together by circuit means, at least one signal input for each bi-stable device, at least one signal output for each bi-stable device, wherein a stage may be set in any of three states, viz. to register nothing when both devices are set in a first state or to register a 0 digit by the application of a signal to set one bi-stable device in a second state, or to register a 1 digit by the application of a signal to set the other bi-stable device in said second state, each device being inhibited by the circuit means from being set in said second state by the application of a signal while the other device of that stage has been set in said second state, holding means being provided which may hold both devices of a stage in said first state.

Each bi-stable device may comprise two NOR gates each having at least two inputs, one of which is connected to the output of the other NOR gate of that device. A NOR gate is a gate constructed to provide an output signal only when it receives no input signal.

Means may be provided to inhibit the transmission of signals from each device of a stage to its signal output unless both devices of the previous stage are in said first state.

A re-set input may be provided in each stage by which a signal may be applied to the holding means. This re-set input may be connected to the means for inhibiting the transmission of signals from each device of the preceding stage to its output.

The re-set inputs of the odd numbered stages, that is to say the first, third, fifth etc. stages, may be connected together and the re-set inputs of the even numbered stages may also be connected together.

The devices of a stage may be connected so as to operate the holding means of the succeeding stage when those devices are both in said first state.

Conveniently, one signal output of one device of each odd numbered stage is connected to one output line, one signal output of the other device of each odd numbered stage is connected to a second output line, one signal output of one device of each even numbered stage is connected to a third output line, and one signal output of the other device of each even numbered stage is connected to a fourth output line.

Conveniently, one signal input of one device of each odd numbered stage is connected to one input line, one input of the other device of each odd numbered stage is connected to a second input line, one input of one device of each even numbered stage is connected to a third input line, and one input of the other device of each even numbered stage is connected to a fourth input line.

A further signal input of one device in each stage may be connected to an input of one NOR gate of that device and to an input of the other NOR gate of the other device of that stage.

A specific embodiment of the invention will now be described with reference to the accompanying drawing, which is a schematic circiut diagram of an odd numbered stage followed by an even numbered stage in a binary ditigal register.

According to this embodiment of the invention, a register comprises a number of stages connected together in cascade. Each stage can exist in one of three states, namely nothing, zero or one. Each stage 10 contains two bi-stable devices. The setting of both bi-stable devices in one stage in one condition indicates the nothing state and the setting of one or other of the devices in the other condition indicates a zero or a one state respectively. The bi-stable devices of each stage are themselves connected together so that both bi-stable devices cannot be in said other condition at the same time. The stages are so connected that a stage cannot change from the nothing state if the previous stage is still in the nothing state, and also that a stage cannot be changed between zero and one states without changing to the nothing state first.

The zero bi-stable device of a stage 10 comprises two NOR gates 11, 12 each having one input connected to the output of the other gate. The one bi-stable device is identical, having two NOR gates 13, 14. A NOR gate produces a negative voltage at its output provided there are positive voltages on all its inputs. If one input has a negative voltage applied to it, the output is positive. The NOR gates each have other inputs besides the input connected to the output of the other NOR gate of the bi-stable device. If a negative voltage is applied to one of these further inputs, that NOR gate cannot be switched on and the bi-stable relationship between that NOR gate and the other NOR gate of the bi-stable device is cancelled. The second NOR gate 12 has another input 15 connected to the output of the second NOR gate 14 of the other device of that stage, and similarly this gate 14 has another input 16 connected to the output of gate 12, so that normally gates 12, 14 are connected together in a bi-stable relationship. The second NOR gates 12, 14 have third inputs 17, 18 connected to a common line 19.

When a negative going voltage is applied to the common line 19, both the second NOR gates 12, 14 produce a positive going voltage at their outputs, i.e. they are switched off. The first gates 11, 13 of the bi-stable devices are both on, since the positive voltage from the second NOR gates is applied to one of their inputs, the bi-stable relationship between the gates 12, 14 is cancelled by the negative voltage on the common line 19. The stage is then in the nothing state. When the negative voltage is removed from the line 19, the bi-stable relationship between the second NOR gates 12, 14 may be resumed.

The stage is then set into the zero or one condition by applying a negative voltage to the appropriate first NOR gate 11 or 13. The application of the voltage to the first NOR gate switches it off, so that all the inputs to its second NOR gate are positive and the second NOR gate is switched on. The bi-stable relationship between the second NOR gates 12, 14, is such that once one gate has been switched on, the other second gate has a negative voltage on one of its inputs and cannot be switched on. Thus the bi-stable relationship between the NOR gates of the one or zero bi-stable device is cancelled when the stage is in the zero or one state respectively.

The outputs of the gates 12, 14 are connected to respective inputs of a fifth NOR gate 21 in the succeeding stage, whose output is applied to the common line of that stage. A stage can only be set into the zero or one condition when there is a positive voltage on the common line 19, and normally this only happens when there is a negative voltage from the one of the outputs of the gates 12, 14 of the preceding stage, that is when the preceding stage is set in the zero or one condition.

The stages can be set in the zero or one condition from serial or parallel inputs. The serial input of gate 11 in each odd stage is connected to the odd serial zero input line 22, and those in the even stages to the even serial input line 23. Similarly the serial inputs of gates 13 are connected to the appropriate odd or even serial one input lines 24 or 25. The four input lines 22 to 25 enable the register to be integrated with the four tone method of signal transmission in which four channels are used to carry the information. Since a stage cannot be set in the zero or one condition until the preceding stage has been set, and its condition may not be changed directly from one to the other when it has been set, each stage can be set in the required condition by applying signals in turn to the appropriate odd and even serial input lines.

The gates 11, 13 have parallel inputs 26, 27 to which negative voltages may be applied to set the stage. If a stage is to be set by another register with a single output wire, so that a zero is indicated by not applying a negative voltage to the parallel input 27 of the first one gate 13, a cross connection 28 is made between this parallel input 27 and an input of the second zero gate 12 of the same stage. A negative voltage is applied to the parallel inputs 27 of the stages to be set in the one state by the register with the single output wire and a negative voltage is also applied to the zero parallel input 26 of every stage. Thus every stage is set in the zero state except those with a negative voltage applied on the cross connection 28, since in these stages the second zero gate 12 remains off, and the first one gate 13 is switched off, causing the second one gate 14 to switch on and set these stages in the one condition.

The outputs from each stage are taken from the outputs of the first gates 11, 13. The parallel outputs 31, 32 are taken direct and the serial output lines are fed through diodes 33 through further NOR gates, 34, 35, one 34 for the zero and one 35 for the one bi-stable device in each stage. There are separate serial output lines 36 to 39 for the zero and one channels of odd and even stages respectively, corresponding to the four tone method of signal transmission. Each NOR gate 34, 35 has further inputs connected respectively to the output of the gate 12 of the preceding stage, to the output of the gate 14 of the preceding stage and to a single clock pulse terminal 41 in the succeeding stage. The clock pulse terminal 41 of each stage is connected to a further input of the fifth NOR gate 21 in its stage. The terminals 41 of the odd and even stages are connected to odd and even clock pulse lines 42, 43 respectively.

When information is being fed into the register, a continuous positive voltage is applied to terminal 41 in each stage. When information is to be read out serially from the register, a negative voltage with positive going clock pulses applied to it is applied to the odd and even clock pulse lines 42, 43. The clock pulses on line 42 are in anti-phase to those on line 43.

A negative voltage may not be applied to a serial output line by one of the NOR gates 34, 35 to represent a digit in that stage when a negative voltage is applied to the NOR gate by gate 12 or gate 14 of the preceding stage or terminal 41 of the succeeding stage. Thus a negative voltage may only be applied to a serial output line when the preceding stage is re-set and when a clock pulse is applied to terminal 41 of the succeeding stage. The first stage reads out a signal to the zero or one serial output line through gate 34 or 35 when a clock pulse is applied to the inputs of gates 34, 35. In the next half clock pulse cycle, there is a positive clock pulse on the input to the gate 21 so that a negative voltage is applied to the common line 19 and the first stage is re-set to the nothing condition. As the first stage is re-set there are no outputs from its gates 12, 14 and the second stage may read out through one of its gates 34, 35. Similarly in the next half clock pulse cycle, the second stage re-sets and the third stage reads out.

In the first stage, the voltages which in other stages would have come from the outputs of gates 12, 14 of the preceding stages must be supplied, being negative during the read-in operation and positive during the read-out operation.

I claim:

1. A binary digital register comprising a number of stages for storing information in digital form wherein each stage comprises two pairs of gates connected together by circuit means, each gate having two positions, the circuit means normally connecting the gates of one pair in a bistable relationship, and the circuit means normally connecting the gates of the second pair in a bistable relationship, each state of the bistable relationships including one gate in the opposite position to that of the other gate of the pair, the circuit means further connecting together one gate of each pair so that when either pair of gates is switched into one state the bistable relationship between the gates of the other pair is inhibited, the said one gate of said other pair being held in the opposite position to the said one gate of the pair switched into said one state, at least one signal input for each pair of gates, the register further comprising at least one signal output for each pair of gates, each pair of gates providing a continuous signal on its signal output or outputs which signal is dependent on the state of the pair wherein a stage may be set in any of three states viz. to register nothing when both pairs of gates are switched into said other state, or to register a 0 digit or a 1 digit when one or other pair of gates is switched into said one state, holding means being provided for holding both pairs of gates in said other state.

2. A binary digital register as claimed in claim 1 comprising further circuit means connected between the pairs of gates of one stage and the pairs of gates of the preceding stage to inhibit the transmission of signals from the pairs of gates of a stage to their signal outputs unless both pairs of gates of the preceding stage are in said other state.

3. A binary digital register as claimed in claim 2 comprising circuit means connecting the holding means of one stage to the means for inhibiting the transmission of signals from the pairs of gates of the preceding stage to their signal outputs.

4. A binary digital register as claimed in claim 3 comprising a reset input line connecting together the holding means of odd numbered stages for simultaneous operation, and a second reset input line connecting together the holding means of the even numbered stages for operation together.

5. A binary digital register as claimed in claim 1 comprising circuit means connected to the pairs of gates of one stage and to the holding means of the succeeding stage to operate said holding means when the pairs of gates of said one stage are both in said other state.

6. A binary digital register as claimed in claim 1 comprising four signal output lines, one connected to the signal output of one pair of gates of each odd numbered stage, one connected to the other pair of gates of each odd numbered stage, one connected to one pair of gates of each even numbered stage, and one connected to the other pair of gates of each odd numbered stage.

7. A binary digital register as claimed in claim 1 comprising four signal input lines, one connected to a signal input of one pair of gates of each odd numbered stage, one connected to an input of the other pair of gates of each odd numbered stage, one connected to a signal input of one pair of gates of each even numbered stage, and one connected to a signal input of the other pair of gates of each even numbered stage.

8. A binary digital register as claimed in claim 1 comprising a secondary signal input for a stage, connected to an input of one gate of one pair, and to an input of the other gate of the other pair of that stage.

9. A binary digital register comprising a number of stages for storing information in digital form wherein each stage comprises a reset input, two pairs of NOR gates, each gate having an output and a number of inputs, the output of each gate of a pair being connected to one input of the other gate of that pair, the output of one gate of each pair being connected to an input of said one gate of the other pair, a signal input for each pair of gates connected to an input of said other gate of each pair, a third NOR gate for each pair having an input connected to the output of said other gate of the pair, an input of said third NOR gate being connected to the output of said one gate of one pair of the preceding stage and having a second input connected to the output of said one gate of the other pair of the preceding stage, each third NOR gate having a further input connected to the reset input of the succeeding stage, the output of the third NOR gate associated with a pair being connected to an output terminal, each stage comprising a seventh NOR gate having one input connected to the output of said one gate of one pair of the preceding stage, a second input connected to the output of said one gate of the other pair of the preceding stage and a third input connected to the reset input of that stage, the output of the seventh NOR gate being connected to an input of both said one gates of the pairs of that stage.

References Cited by the Examiner

UNITED STATES PATENTS

| | | | |
|---|---|---|---|
| 3,050,714 | 8/62 | Campbell | 328—37 X |
| 3,107,306 | 10/63 | Dobbie | 307—88.5 |

ARTHUR GAUSS, *Primary Examiner.*